United States Patent
Coldwate et al.

(10) Patent No.: US 11,411,448 B2
(45) Date of Patent: Aug. 9, 2022

(54) MOTOR STATOR CORE DESIGN WITH INTEGRAL COOLING DUCT WITHIN TEETH

(71) Applicant: HAMILTON SUNDSTRAND CORPORATION, Charlotte, NC (US)

(72) Inventors: Joseph Kenneth Coldwate, Roscoe, IL (US); Wilfredo E. Colon Velazquez, Saint Cloud, FL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 197 days.

(21) Appl. No.: 16/559,248

(22) Filed: Sep. 3, 2019

(65) Prior Publication Data

US 2021/0066978 A1 Mar. 4, 2021

(51) Int. Cl.
*H02K 1/20* (2006.01)
*H02K 1/16* (2006.01)

(52) U.S. Cl.
CPC ............... *H02K 1/20* (2013.01); *H02K 1/16* (2013.01)

(58) Field of Classification Search
CPC .................................. H02K 1/20; H02K 1/16
See application file for complete search history.

(56) References Cited

U.S. PATENT DOCUMENTS

| 3,675,056 | A | | 7/1972 | Lenz | |
|---|---|---|---|---|---|
| 4,182,966 | A | * | 1/1980 | Mishra | H02K 1/20 310/269 |
| 5,866,959 | A | | 2/1999 | Le Flem | |
| 2014/0021819 | A1 | * | 1/2014 | Hong | H02K 1/28 310/156.22 |
| 2015/0340918 | A1 | * | 11/2015 | Bialik | H02K 15/0093 310/54 |
| 2016/0197526 | A1 | * | 7/2016 | Fan | F04C 18/10 62/505 |
| 2018/0054097 | A1 | | 2/2018 | Dlala et al. | |
| 2018/0287436 | A1 | * | 10/2018 | Xu | H02K 7/006 |
| 2019/0020231 | A1 | | 1/2019 | Dlala et al. | |

FOREIGN PATENT DOCUMENTS

| CN | 109831042 | A | | 3/2019 | |
|---|---|---|---|---|---|
| CN | 208939678 | U | | 6/2019 | |
| DE | 3504782 | A | * | 8/1986 | ............... H02K 1/20 |
| EP | 0155405 | A1 | | 9/1985 | |
| JP | S58215954 | A | | 12/1983 | |

OTHER PUBLICATIONS

Schmauck (DE 3504782 A) English Translation (Year: 1986).*
European Search Report Application No. EP19215358; dated Jun. 26, 2020; pp. 7.

* cited by examiner

*Primary Examiner* — Tulsidas C Patel
*Assistant Examiner* — Robert E Mates
(74) *Attorney, Agent, or Firm* — Cantor Colburn LLP

(57) ABSTRACT

A stator core is provided and includes laminations disposed in a laminated arrangement to form a stator core body having an axial length extending in a lamination dimension. The stator core body includes an annular portion extending along the axial length and teeth extending radially from the annular portion and along the axial length. Each tooth has a trapezoidal shape and is formed to define one or more triangular holes running along the axial length.

4 Claims, 4 Drawing Sheets

MOTOR STATOR CORE DESIGN WITH INTEGRAL COOLING DUCT WITHIN TEETH

BACKGROUND

The following description relates to motor stator cores and, more specifically, to a motor stator core with teeth and integral cooling ducts within interstitial space between the teeth.

In a motor, a rotor can be rotatable disposed within a bore defined through a stator or about an exterior of the stator. In the former case, the rotor can be a shaft with a circular outer diameter that is equipped with a series of magnetic materials. The stator has a hub and a series of teeth extending radially inwardly from the hub toward the rotor. Windings made of conductive material are would around each of the teeth. An air gap is provided between the rotor and the stator. When current is applied to the windings, a resultant magnetic flux interacts with the magnetic materials of the rotor to drive rotations of the rotor about its longitudinal axis. In the case where the rotor is disposed about an exterior of the stator, the teeth of the stator extend radially outwardly but the operation of the motor is generally similar.

Since the motor described above relies on current being applied to the windings, it is often necessary for the motor to be cooled. In many cases, this cooling is partially achieved by the motor being configured as an air-cooled motor but it is often the case that air-cooled motors are not adequately cooled. When this happens, the air-cooled motors suffer from reduced reliability due to insulation breakdown from routine exposure to excessive temperatures.

BRIEF DESCRIPTION

According to an aspect of the disclosure, a stator core is provided and includes laminations disposed in a laminated arrangement to form a stator core body having an axial length extending in a lamination dimension. The stator core body includes an annular portion extending along the axial length and teeth extending radially from the annular portion and along the axial length. Each tooth has a trapezoidal shape and is formed to define one or more triangular holes running along the axial length.

In accordance with additional or alternative embodiments, the teeth are substantially uniform in size and shape and the one or more triangular holes are substantially uniform in size and shape.

In accordance with additional or alternative embodiments, each tooth has a first wide portion, a first narrow portion and sidewalls extending between the first wide portion and the first narrow portion and each of the one or more triangular holes defined by each tooth has a second wide portion corresponding with the first wide portion and a second narrow portion corresponding with the first narrow portion.

In accordance with additional or alternative embodiments, the one or more triangular holes in each tooth is a pair of triangular holes bisected by a radially oriented member of the stator core body.

In accordance with additional or alternative embodiments, the one or more triangular holes in each tooth is a single triangular hole having a radial length which exceeds half a radial length of the corresponding tooth.

In accordance with additional or alternative embodiments, the teeth extend radially inwardly from the annular portion or radially outwardly from the annular portion.

According to another aspect of the disclosure, a stator core is provided and includes laminations disposed in a laminated arrangement to form a stator core body having an axial length extending in a lamination dimension. The stator core body includes an annular ring portion extending along the axial length and teeth extending radially inwardly from the annular ring portion and along the axial length. Each tooth has a trapezoidal shape and is formed to define one or more triangular holes running along the axial length.

In accordance with additional or alternative embodiments, the teeth are substantially uniform in size and shape and the one or more triangular holes are substantially uniform in size and shape.

In accordance with additional or alternative embodiments, each tooth has a first wide portion at an inner diameter of the annular ring portion, a first narrow portion displaced radially inwardly from the inner diameter of the annular ring portion and sidewalls extending between the first wide portion and the first narrow portion and each of the one or more triangular holes defined by each tooth has a second wide portion corresponding with the first wide portion and a second narrow portion corresponding with the first narrow portion.

In accordance with additional or alternative embodiments, the one or more triangular holes in each tooth is a pair of triangular holes bisected by a radially oriented member of the stator core body.

In accordance with additional or alternative embodiments, the one or more triangular holes in each tooth is a single triangular hole having a radial length which exceeds half a radial length of the corresponding tooth.

According to another aspect of the disclosure, a motor is provided and includes laminations disposed in a laminated arrangement to form a stator core body having an axial length extending in a lamination dimension. The stator core body includes an annular portion extending along the axial length and teeth extending radially from the annular portion and along the axial length. Each tooth has a trapezoidal shape and is formed to define one or more triangular holes running along the axial length, windings wound around the teeth and a rotor, which is drivable to rotate about a longitudinal axis thereof by current being applied to the windings.

In accordance with additional or alternative embodiments, the laminations include iron.

In accordance with additional or alternative embodiments, the one or more triangular holes are receptive of a cooling air flow.

In accordance with additional or alternative embodiments, the teeth are substantially uniform in size and shape and the one or more triangular holes are substantially uniform in size and shape.

In accordance with additional or alternative embodiments, multiple windings are arranged along a radial dimension between neighboring teeth and have a substantially uniform width along the radial dimension, each tooth has a first wide portion, a first narrow portion and sidewalls extending between the first wide portion and the first narrow portion and each of the one or more triangular holes defined by each tooth has a second wide portion corresponding with the first wide portion and a second narrow portion corresponding with the first narrow portion.

In accordance with additional or alternative embodiments, the one or more triangular holes in each tooth is a pair of triangular holes bisected by a radially oriented member of the stator core body.

In accordance with additional or alternative embodiments, the one or more triangular holes in each tooth is a single triangular hole having a radial length which exceeds half a radial length of the corresponding tooth.

In accordance with additional or alternative embodiments, the annular portion is an annular ring portion, the teeth extend radially inwardly from an inner diameter of the annular ring portion and the rotor is rotatable within the stator core body.

In accordance with additional or alternative embodiments, the annular portion is an annular cylinder portion, the teeth extend radially outwardly from an outer diameter of the annular cylinder portion and the rotor is rotatable about the stator core body.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

For air-cooled motors, stators can be provided with hairpin type designs that generally have teeth shaped like trapezoids and straight (parallel sides) slots between the trapezoidal teeth. The trapezoidal shape of each tooth in these cases has a wide base and a narrow tip and can often have more iron than needed near the thicker base. As a consequence, stators with such hair-pin type designs may not be adequately cooled and may have relatively high overall weights and correspondingly high core losses as well.

Thus, as will be described below, a stator of a motor is provided with a triangular shaped hole in laminations located at roots of each of the stator teeth. The motor can be, but is not required to be, provided as an air-cooled motor.

Figure 1:
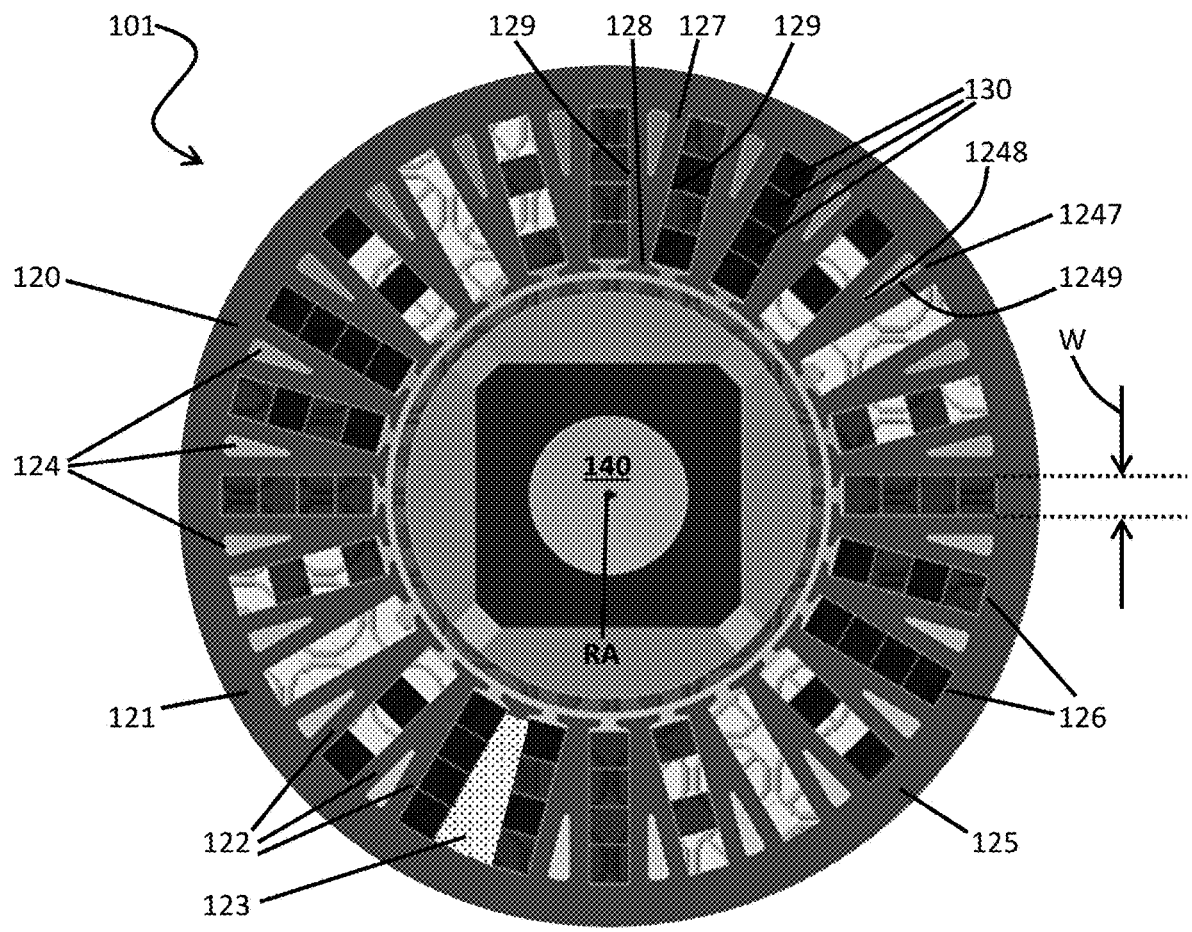
FIG. 1 is an axial view of a motor with an inner rotor and an outer stator core, where the outer stator core has trapezoidal teeth defining triangular cooling holes between neighboring windings in accordance with embodiments.
Figure 2:
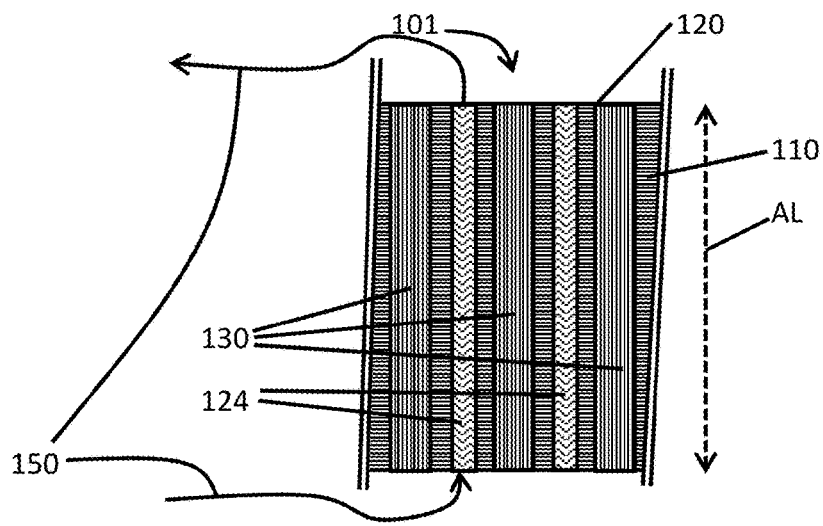
FIG. 2 is a side view of the motor of FIG. 1 in accordance with embodiments.

With reference to FIGS. 1 and 2, a motor 101 is provided and includes laminations 110 (see FIG. 2) that are disposed in a laminated arrangement to form a stator core body 120. The laminations 110 can include iron or other similar elements and alloys thereof. The motor 101 further includes windings 130 and a rotor 140. The stator core body 120 has an axial length AL (see FIG. 2) extending in a lamination dimension and includes an annular portion 121 and teeth 122. The annular portion 121 extends along the axial length AL. The teeth 122 extend radially from the annular portion 121 and along the axial length AL. Each tooth 122 has a trapezoidal shape 123 and is formed to define one or more triangular holes 124 running along the axial length AL.

During operations of the motor 101, the one or more triangular holes 124 can be receptive of a cooling airflow 150. Each of the one or more triangular holes 124 thus acts as a cooling duct located in a root of the corresponding tooth 122 and serves to remove self-generated heat from the windings 130 and the stator core body 120. A flux path down the tooth 122 is not affected by the presence of the one or more triangular holes 124.

The teeth 122 are all substantially a same shape and size. Similarly, the one or more triangular holes 124 are all substantially a same shape and size.

In accordance with embodiments and, as shown in FIG. 1 (and in FIGS. 3 and 4), the stator core body 120 can be formed about the rotor 140. In these or other cases, the annular portion 121 is an annular ring portion 125 and the teeth 122 extend radially inwardly from an inner diameter of the annular ring portion 125. The radially inward ends of the teeth 122 form a stator bore. The windings 130 are wound around the teeth 122 and are thus arranged in slots 126 between neighboring teeth 122. The windings 130 are configured to carry current applied thereto. The rotor 140 can be provided as a shaft having a rotational axis RA extending along a central longitudinal axis thereof and includes magnetic elements arrayed on an outer surface thereof. The rotor 140 is thus drivable to rotate within the stator bore of the stator core body 120 by magnetic flux generated by current being applied to the windings 130. As noted above, this magnetic flux extends axially through the teeth 122 and is not affected by the presence of the one or more triangular holes 124.

In accordance with embodiments, multiple windings 130 can be arranged along a radial dimension between neighboring teeth 122. The trapezoidal shape of the teeth 122 allow for the formation of the slots 126 to have substantially rectangular shapes and the windings 130 in each slot 126 between neighboring teeth 122 can have a substantially uniform width W along the radial dimension. In these or other cases, each tooth 122 has a first wide portion 127 at its root near or at the annular ring portion 125, a first narrow portion 128 remote from the root and sidewalls 129 extending between the first wide portion 127 and the first narrow portion 128. Here, each of the one or more triangular holes 124 defined by each tooth 122 has a second wide portion 1247 corresponding with the first wide portion 127, a second narrow portion 1248 corresponding with the first narrow portion 128 and sidewalls 1249 that are parallel with the sidewalls 129.

Figure 3:
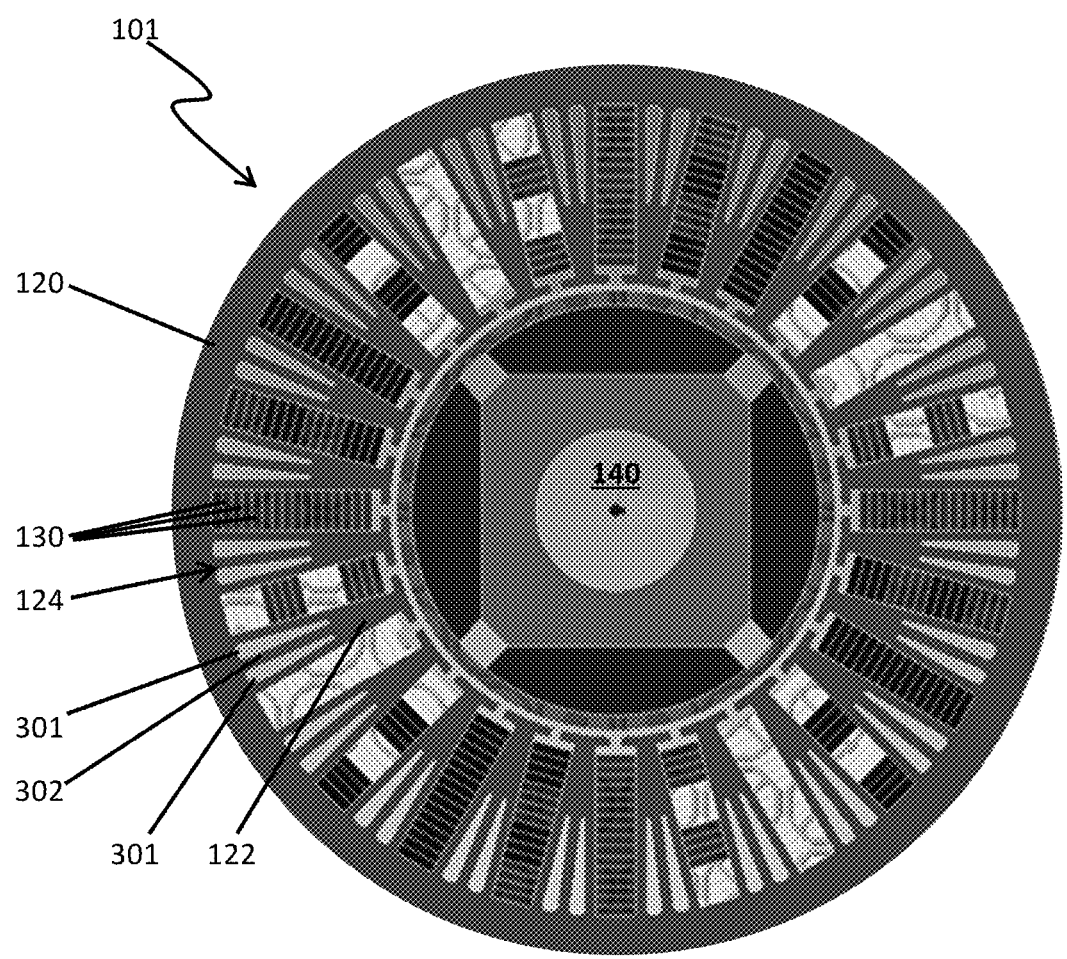
FIG. 3 is an axial view of a motor with an inner rotor and an outer stator core, where the outer stator core has trapezoidal teeth defining multiple triangular cooling holes between neighboring windings in accordance with embodiments.

With reference to FIG. 3 and, in accordance with embodiments, the one or more triangular holes 124 in each tooth 122 is a pair of triangular holes 301 bisected by a radially oriented member 302 of the stator core body 120. In this case, a surface area of the pair of triangular holes 301 and the radially oriented member 302 is maximized to provide for relatively high thermal communication in the stator core body 120. As above, a flux path extending axially along each tooth 122 is not affected by the presence of the pair of triangular holes 301 or the radially oriented member 302.

Figure 4:
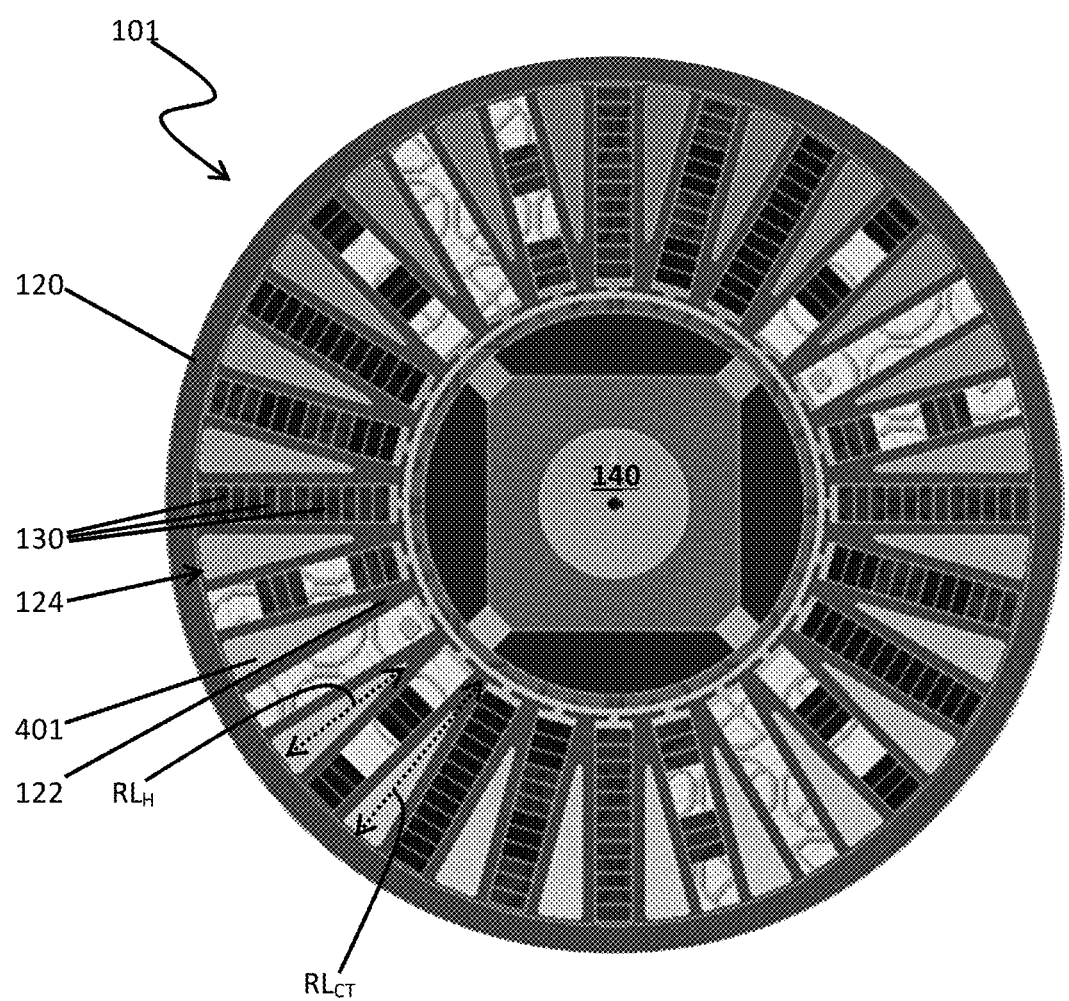
FIG. 4 is an axial view of a motor with an inner rotor and an outer stator core, where the outer stator core has trapezoidal teeth defining triangular cooling holes of relatively large dimensions between neighboring windings in accordance with embodiments.

With reference to FIG. 4 and, in accordance with embodiments, the one or more triangular holes 120 in each tooth 122 is a single triangular hole 401. The single triangular hole 401 has a radial length $RL_H$ which exceeds half a radial length $RL_{CT}$ of the corresponding tooth 122. In this case, a triangular cooling duct area provided by each single triangular hole 401 is maximized to provide very low pressure drop across the stator core body 120. Again as above, a flux path extending axially along each tooth 122 is not affected by the presence of the single triangular hole 401.

Figure 5:
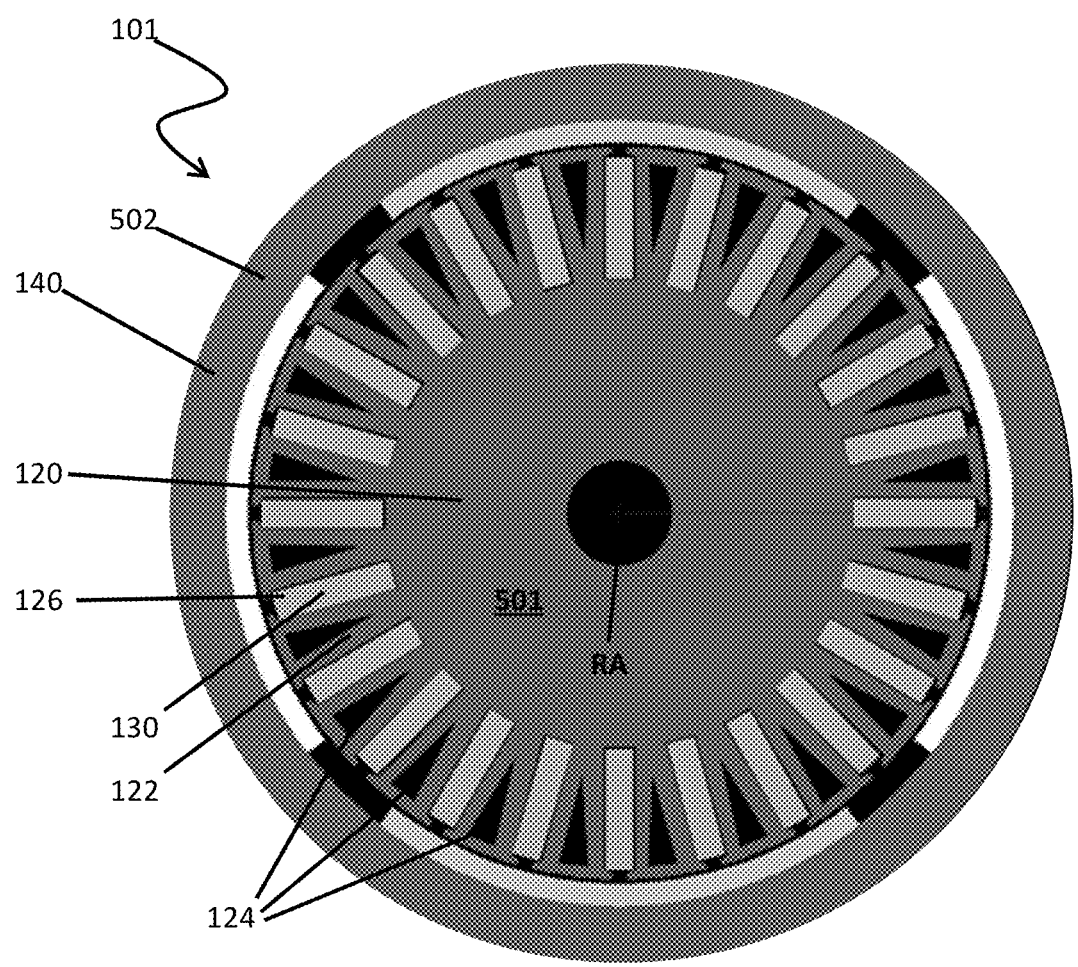
FIG. 5 is an axial view of a motor with an outer rotor and an inner stator core, where the inner stator core has trapezoidal teeth defining triangular cooling holes between neighboring windings in accordance with embodiments.

In accordance with alternative embodiments and, as shown in FIG. 5, the rotor 140 can be formed about the stator core body 120. In these or other cases, the annular portion 121 is an annular cylinder portion 501 and the teeth 122 extend radially outwardly from an outer diameter of the annular cylinder portion 501. As above, the windings 130 are wound around the teeth 122 and are thus arranged in slots 126 between neighboring teeth 122. The windings 130 are configured to carry current applied thereto. The rotor 140 can be provided as a cylinder 502 having a rotational axis RA extending along a central longitudinal axis of the stator core body 120 and includes magnetic elements arrayed on an interior surface thereof. The rotor 140 is thus drivable to rotate about the stator core body 120 by magnetic flux generated by current being applied to the windings 130. As noted above, this magnetic flux extends axially through the teeth 122 and is not affected by the presence of the one or more triangular holes 124.

Although the various embodiments of FIGS. 1 and 2, 3, 4 and 5 are described separately, it is to be understood that they are interchangeable. For example, the one or more triangular holes 124 of FIG. 5 can be provided as pairs of triangular holes as in FIG. 3 or as single triangular holes as in FIG. 4. In addition, it is to be understood that the various embodiments of FIGS. 1 and 2, 3, 4 and 5 can be used in combination with one another. For example, the pairs of triangular holes of FIG. 3 and the single triangular holes of FIG. 4 can be interspersed throughout the configurations of FIGS. 1 and 5.

Technical effects and benefits of the enclosure design of the present disclosure are that, when the laminations of the stator are stacked and bonded to form a stator core, the triangular hole in the root of each of the stator teeth forms a channel down an entire length of the stator core. This triangular shaped channel serves as an additional cooling passage to help reject additional heat from the windings to the cooling medium flowing through it (air, oil, etc.). In addition, removal of the material from the triangular hole reduces part weight and also helps to reduce iron core losses.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A stator core, comprising:
laminations disposed in a laminated arrangement to form a stator core body having an axial length extending in a lamination dimension, the stator core body comprising:
an annular ring portion extending along the axial length; and
teeth extending radially inwardly from the annular ring portion and along the axial length,
each tooth having a trapezoidal shape and being formed to define one or more triangular holes running along the axial length,
wherein:
the one or more triangular holes in each tooth is a pair of triangular holes bisected by a radially oriented member of the stator core body,
the radially oriented member is thinner than a maximum thickness of each of the pair of triangular holes bisected by the radially oriented member, and
each triangular hole has a radial length which exceeds half a radial length of the corresponding tooth.

2. The stator core according to claim 1, wherein:
the teeth are substantially uniform in size and shape, and
the one or more triangular holes are substantially uniform in size and shape.

3. The stator core according to claim 1, wherein:
each tooth has a first wide portion at an inner diameter of the annular ring portion, a first narrow portion displaced radially inwardly from the inner diameter of the annular ring portion and sidewalls extending between the first wide portion and the first narrow portion, and
each of the one or more triangular holes defined by each tooth has a second wide portion corresponding with the first wide portion and a second narrow portion corresponding with the first narrow portion.

4. The stator core according to claim 1, wherein the pair of triangular holes extend radially inwardly from the annular ring portion.

* * * * *